M. E. LINDSKOOG.
COIL SPRING SEAT FOR DISKS.
APPLICATION FILED AUG. 3, 1915.

1,229,488.

Patented June 12, 1917.

Witnesses
Will Freeman.
Adele Sherman

Inventor
M. E. Lindskoog
By Orwig & Bair
Attorney.

UNITED STATES PATENT OFFICE.

MILTON EMANUEL LINDSKOOG, OF KIRON, IOWA.

COIL-SPRING SEAT FOR DISKS.

1,229,488.  Specification of Letters Patent.  Patented June 12, 1917.

Application filed August 3, 1915. Serial No. 43,485.

*To all whom it may concern:*

Be it known that I, MILTON EMANUEL LINDSKOOG, a citizen of the United States, and a resident of Kiron, in the county of Crawford and State of Iowa, have invented a certain new and useful Coil-Spring Seat for Disks, of which the following is a specification.

The object of my invention is to provide a spring seat for agricultural implements such as disks and the like.

A further object is to provide such a spring seat of simple, durable and inexpensive construction, so constructed and arranged that it may be readily and easily attached to different kinds of farm implements and when mounted will be permitted resilient movement to save the rider from the jar and vibration to which the ordinary seats are subjected.

Figure 1:
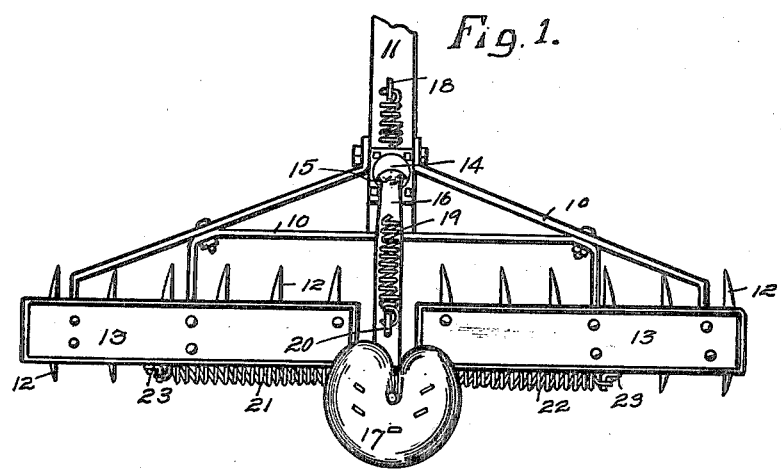
Figure 2:
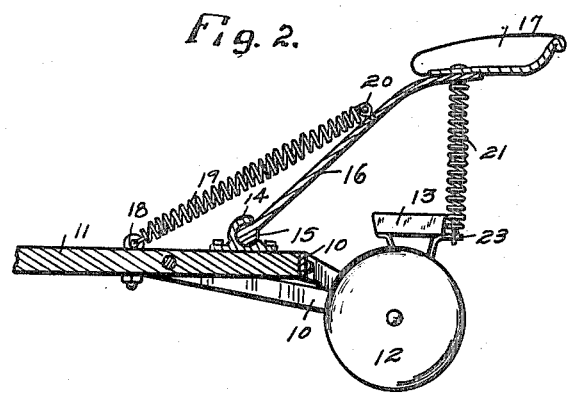

My invention consists in the construction, arrangement and combination of the various parts of the device whereby the objects contemplated are attained as hereinafter more fully set forth pointed out in my claim and illustrated in the accompanying drawings, in which:

Figure 1 shows a top or plan view of a disk equipped with a spring seat embodying my invention, and Fig. 2 shows a central vertical sectional view through the same.

In the accompanying drawings, I have used the reference numeral 10 to indicate generally the frame of a disk having the tongue 11, the rotary disk members 12, and the ordinary box 13 for carrying weights.

My improved spring seat member comprises a socket 14 designed to be mounted on the top of the tongue 11 near the rear end thereof, as illustrated in the drawings.

Mounted in the socket 14 is a ball 15, on which is an upwardly and rearwardly extending seat supporting member 16, which may be of spring metal if desired. On the upper end of the member 16 is bolted an ordinary seat 17.

Secured to the tongue 11 in front of the ball and socket joint, hereinbefore described, by means of a bolt 18, is a powerful coil spring 19, which extends rearwardly and upwardly and is secured at its upper end to an eye 20 on the upper portion of the seat supporting member 16.

Secured to the under surface of the seat are two coil springs 21 and 22 extending laterally and downwardly, and secured at their lower ends to brackets 23. The brackets 23 are secured on the frame of the machine in any suitable way. It will be seen that a weight imposed on the seat 17 will tend to compress the springs 21 and 22 and to extend the spring 19. The spring 19 yieldingly holds the seat 17 against rearward and downward movement, and the springs 21 and 22 prevent too great lateral swinging movement of the seat. The springs 21 and 22 are so arranged that should the seat be moved laterally, for instance, to the left, the spring 22 would tend to pull it back to position, while the spring 21 would tend to push it back to its normal central position. On account of the fact that the spring 19 is secured to the tongue 11 in front of the member 16 and to the member 16 rearwardly of the ball and socket joint, it will be seen that when the seat swings laterally, then the spring 19 will tend to increase the lateral swing, and any movement of the seat toward normal position will be against the action of the spring 19. Thus the spring 19 serves a double function. It supports the seat 17 against swinging rearwardly and downwardly, and also tends to counteract and cushion the rebound of the springs 21 and 22, after the seat has been swung laterally and during the return of the seat past normal position with a slight jerk. This is to a considerable extent overcome by the arrangement of the spring 19, as shown.

It will be seen that the parts are of comparatively simple and inexpensive construction, and may be readily attached or mounted on the frame of many farm machines such as mowers, binders and the like.

The inconvenience of the jar and vibration in machines of this type is well known, and is perhaps greater in disks than in other farm machines. The use of a seat supported, as herein described, frees the driver from the ordinary jar to which he would otherwise be subjected.

Some changes may be made in the construction, and arrangement of the parts of my improved coil spring seat without departing from its essential features and purposes, and it is my intention to cover by this application any such changes which may be reasonably included within the scope of my claim.

I claim as my invention:

In a device of the class described, a frame, a seat supporting member, a universal joint for supporting the lower end of said seat supporting member on the frame, said seat supporting member extending upwardly and rearwardly from said joint, a spring secured to said seat supporting member rearwardly of said joint near the upper portion of said member, and to said frame, in front of said joint, a seat on the upper end of said member, springs operatively connected with said seat and extending laterally on the opposite sides thereof, and secured to said frame for yieldingly holding said seat against lateral tilting, said first spring being so arranged as to cushion the rebound of said seat when the seat has been moved laterally from its normal position and is returned to said normal position.

Des Moines, Iowa, July 17, 1915.

MILTON EMANUEL LINDSKOOG.

Witnesses:
STARR G. WILSON,
CHAS D. HOAGLAND.